US006109803A

United States Patent [19]

Yasui et al.

[11] Patent Number: 6,109,803

[45] Date of Patent: Aug. 29, 2000

[54] INFORMATION RECORDING METHOD AND PRINTER

[75] Inventors: Tsuneo Yasui, Nagoya; Kazuhiko Matsuda, Kounan; Hakudai Kondo, Nagoya; Masashi Suzuki, Nagoya; Akira Sago, Seto, all of Japan

[73] Assignee: Brother Kogyo Kabushiki Kaisha, Nagoya, Japan

[21] Appl. No.: 09/020,689

[22] Filed: Feb. 10, 1998

[30] Foreign Application Priority Data

Feb. 13, 1997 [JP] Japan .................................... 9-029346
Feb. 13, 1997 [JP] Japan .................................... 9-029347

[51] Int. Cl.[7] ........................... B45J 25/304; G01D 15/16

[52] U.S. Cl. ............................................. 400/320; 347/88

[58] Field of Search ................................ 400/320, 124.1; 347/88

[56] References Cited

U.S. PATENT DOCUMENTS

| | | | |
|---|---|---|---|
| 5,276,468 | 1/1994 | Deur et al. | 347/88 |
| 5,341,164 | 8/1994 | Miyazawa et al. | 347/88 |
| 5,392,065 | 2/1995 | Suzuki | 347/88 |
| 5,910,810 | 6/1999 | Brooks et al. | 347/88 |

FOREIGN PATENT DOCUMENTS

| | | | |
|---|---|---|---|
| 362290545A | 12/1987 | Japan | 347/88 |
| 363028653A | 2/1988 | Japan | 347/88 |
| 406143558A | 5/1994 | Japan | 347/88 |

*Primary Examiner*—Eugene Eickholt
*Attorney, Agent, or Firm*—Oliff & Berridge, PLC

[57] ABSTRACT

A printer is provided with: a heating device for heating a solid ink to dissolve the solid ink into a liquefied ink while an alternative current is supplied thereto; a recording device, on which the heating device is provided, for recording record information onto a record sheet by use of the liquefied ink; and a moving device for moving the recording device. An information recording method is provided with the processes of: moving the recording device by the moving device to an ink dissolving position where a moving terminal, which is fixed on the recording device and is electrically connected to the heating device, and a fixed terminal, which is fixed on a frame member of the printer and is electrically connected to an alternative current source, are contacted with each other, only when the solid ink is to be dissolved in the recording device; supplying the alternative current from the alternative current source to the heating device through the fixed terminal and the moving terminal contacted with each other; moving the recording device in a main scan direction of the record sheet by the moving device after the solid ink is dissolved by the heating device; and recording the record information by use of the dissolved ink onto the record sheet by the recording device while the recording device is moved in the main scan direction by the moving device.

19 Claims, 11 Drawing Sheets

INFORMATION RECORDING METHOD AND PRINTER

BACKGROUND OF THE INVENTION

1. Field of the Invention

The present invention relates to a printer for dissolving a solid ink to a liquefied ink and then recording record information by using the liquefied ink, and an information recording method using the printer.

2. Description of the Related Art

There is a printer for dissolving a solid ink to a liquefied ink and then performing a recording operation by using the liquefied ink. This kind of printer using the solid ink has such a merit that the utilization of the solid ink makes the maintenance easier and that the re-solidification of the ink on a record sheet reduces the bleeding of the ink to thereby perform the recording operation with a high image quality.

The method of actually recording by using the dissolved ink may include, for example, a method of using a record head of ink jet type. If using this method, it is possible to obtain the record result with the higher image quality.

In the above mentioned printer, it is typical that, while the record head is moved in a main scan direction of a record sheet, the record sheet is transported to a sub-scan direction to thereby perform the 2-dimensional recording operation. The solid ink is supplied to the record head by dropping the solid ink retained in an ink retainer section into an ink dissolving section disposed at the record bead. Then, the recording operation is typically performed such that the supplied solid ink is heated and the thus dissolved ink is thermally maintained so as to keep it in the liquefied state.

A common heater heated by a direct current is used as a heater for dissolving the dropped solid ink and as a heater for thermally maintaining the liquefied ink while maintaining the liquefied state.

Typically, a heat quantity required to dissolve the solid ink is extremely larger than that required to keep the dissolved ink in the liquefied state. Thus, if the respective heating operations are performed by the common heater, it takes a long time to convert the solid ink into the liquefied state, which results in a problem that the recording operation is not performed for that long time.

In order to solve this problem, it may be considered to use one heater to which the direct current is applied when keeping the ink in the liquefied state, and to use another heater to which an alternative current having a high electric power is applied, in addition to the one heater to which the direct current is applied, so as to quickly dissolve the solid ink when dissolving the solid ink.

However, the alternative current is not used for the thermally maintaining operation, in the above mentioned method of using both of the direct current and the alternative current (in order to reduce the electric power consumption for the printer as a whole). Thus, it is necessary to control so as to apply the alternative current only when the solid ink is supplied.

However, in a case of performing a speedy recording operation, it is difficult to control the timing of applying the alternative current. Moreover, since an alternative current having a large electric power is applied, it is impossible to use a switch with a high switching speed, such as a semiconductor switch and the like. This results in that it is extremely difficult to control so as to apply the alternative current only at a desired timing, which is a first problem.

On the other hand, in the above mentioned printer, when the solid ink is supplied to the record head by dropping the solid ink retained in the ink retainer section into the ink dissolving section disposed at the record head, the supplied solid ink is heated and dissolved at the position where it is supplied, so as to be used for the recording operation.

However, in a case that the supplied solid ink is heated while the record head is located at the position where the solid ink is supplied to the ink dissolving section, the heat for the heating operation is conducted to the ink retainer section located above the ink dissolving section, which causes the unused solid ink retained therein to be softened. This softened solid ink may be possibly stuck to the ink retainer section. This results in that it may be difficult to smoothly supply the solid ink to the ink dissolving section, which is a second problem.

SUMMARY OF THE INVENTION

The present invention is proposed in view of the above mentioned first problem. It is therefore a first object of the present invention to provide a printer, which can apply an alternative current at a desired timing by an easy control to thereby quickly dissolve a solid ink and in which the electric power consumption can be reduced as a whole, and an information recording method using the printer.

The present invention is also proposed in view of the above mentioned second problem. It is therefore a second of the present invention to provide a printer, which can smoothly supply the solid ink to the record head without softening the retained and unused solid ink, and an information recording method using the printer.

The above first object of the present invention can be achieved by a first information recording method by using a printer. The printer is provided with: a heating device for heating a solid ink to dissolve the solid ink into a liquefied ink while an alternative current is supplied thereto; a recording device, on which the heating device is provided, for recording record information onto a record sheet by use of the liquefied ink; and a moving device for moving the recording device. The first information recording method is provided with the processes of: moving the recording device by the moving device to an ink dissolving position where a moving terminal, which is fixed on the recording device and is electrically connected to the heating device, and a fixed terminal, which is fixed on a frame member of the printer and is electrically connected to an alternative current source, are contacted with each other, only when the solid ink is to be dissolved in the recording device; supplying the alternative current from the alternative current source to the heating device through the fixed terminal and the moving terminal contacted with each other; moving the recording device in a main scan direction of the record sheet by the moving device after the solid ink is dissolved by the heating device; and recording the record information by use of the dissolved ink onto the record sheet by the recording device while the recording device is moved in the main scan direction by the moving device.

According to the first information recording method, only when the solid ink is to be dissolved in the recording device, the recording device is moved by the moving device to the ink dissolving position where the moving terminal and the fixed terminal are contacted with each other. Then, at the ink dissolving position, the alternative current is supplied from the alternative current source to the heating device through the fixed terminal and the moving terminal contacted with each other. Then, after the solid ink is dissolved by the heating device, the recording device is moved in the main scan direction, by the moving device. While the recording device is moved in the main scan direction by the moving device in this manner, the record information is recorded by use of the dissolved ink onto the record sheet by the recording device.

Accordingly, since the alternative current is supplied to the heating device only when the solid ink is to be dissolved (i.e., the alternative current is not supplied to the heating device while the record information is recorded by use of the dissolved ink), the solid ink can be promptly dissolved, and that, the power consumption can be restrained. Further, since it is possible to control the selective supply of the alternative current by moving the recording device, this control of the selective supply of the alternative current can be simplified.

In one aspect of the first information recording method, the process of moving the recording device to the ink dissolving position is performed when a main power for the printer is turned on.

According to this aspect, when the main power for the printer is turned on, the recording device is moved to the ink dissolving position, so that the solid ink is dissolved thereat. Thus, even in a case that the once liquefied ink is solidified again in the recording device until the main power is turned on, this solidified ink can be promptly dissolved again.

In another aspect of the first information recording method, the first information recording method is further provided with the process of supplying a direct current from a direct current source connected to another heating device provided on the recording device so as to maintain a liquefied state of the liquefied ink while recording the record information by the recording device.

According to this aspect, while recording the record information by the recording device, the direct current is supplied from the direct current source connected to another heating device, so that the liquefied state of the liquefied ink can be maintained by another heating device. Thus, since the heat amount to maintain the liquefied state of the liquefied ink is much less than that to dissolve the solid ink, it is possible to prevent the excess and unnecessary heat amount from being generated in the recording device during this period.

In another aspect of the first information recording method, the first information recording method is further provided with the process of supplying a direct current from a direct current source connected to another heating device provided on the recording device so as to maintain a liquefied state of the liquefied ink while the recording device is in a condition of waiting for recording the record information.

According to this aspect, while the recording device is in a condition of waiting for recording the record information, the direct current is supplied from the direct current source connected to another heating device, so that the liquefied state of the liquefied ink can be maintained. Thus, it is possible to restart the actual recording operation promptly after the waiting condition, and that, it is possible to the excess and unnecessary heat amount from being generated in the recording device, during this period.

In another aspect of the first information recording method, the first information recording method is further provided with the processes of: detecting an existence or non-existence of the liquefied ink while recording the record information by the recording device; and supplying the solid ink to the recording device when the non-existence of the liquefied ink is detected by the detecting process.

According to this aspect, while recording the record information by the recording device, the existence or non-existence of the liquefied ink is detected. Then, when the non-existence of the liquefied ink is detected by the detecting process, the solid ink is supplied to the recording device. Thus, the solid ink in an adequate amount can be automatically and speedily supplied to the recording device.

In this aspect, in the process of supplying the solid ink, the recording device may be moved to an ink supplying position where the solid ink is supplied from a retainer for retaining a plurality of solid inks. In this case, the supply of the solid ink to the recording device can be easily and reliably performed at the ink supplying position by means of the retainer.

The above first object of the present invention can be also achieved by a first printer provided with: a heating device for heating a solid ink to dissolve the solid ink into a liquefied ink while an alternative current is supplied thereto; a recording device, on which the heating device is provided, for recording record information onto a record sheet by use of the liquefied ink; a moving terminal fixed on the recording device and electrically connected to the heating device; a fixed terminal fixed on a frame member of the printer and electrically connected to an alternative current source for supplying the alternative current; a moving device for moving the recording device to an ink dissolving position, where the moving terminal and the fixed terminal are contacted with each other, and in a main scan direction of the record sheet; and a controller for controlling the moving device to move the recording device to the ink dissolving position only when the solid ink is to be dissolved so that the alternative current is supplied from the alternative current source to the heating device through the fixed terminal and the moving terminal contacted with each other, controlling the moving device to move the recording device in the main scan direction after the solid ink is dissolved by the heating device, and further controlling the recording device to record the record information by use of the dissolved ink onto the record sheet while the recording device is moved in the main scan direction by the moving device.

According to the first printer, only when the solid ink is to be dissolved in the recording device, the recording device is moved by the moving device to the ink dissolving position, under the control of the controller. Then, at the ink dissolving position, the alternative current is supplied from the alternative current source to the heating device through the fixed terminal and the moving terminal contacted with each other. Then, after the solid ink is dissolved by the heating device, the recording device is moved in the main scan direction, by the moving device, under the control of the controller. While the recording device is moved in the main scan direction by the moving device in this manner, the record information is recorded by use of the dissolved ink onto the record sheet by the recording device.

Accordingly, in the same manner as the aforementioned first information recording method of the present invention, since the alternative current is supplied to the heating device only when the solid ink is to be dissolved, the solid ink can be promptly dissolved, and that, the power consumption can be restrained. Further, the control of the selective supply of the alternative current can be simplified.

In one aspect of the first printer, the controller further controls the moving device to move the recording device to the ink dissolving position when a main power for the printer is turned on. Thus, even in a case that the once liquefied ink is solidified again in the recording device until the main power is turned on, this solidified ink can be promptly dissolved again.

In another aspect of the first printer, the first printer is further provided with another heating device provided on the recording device for heating the liquefied ink so as to maintain a liquefied state of the liquefied ink. Thus, it is possible to maintain the liquefied state of the once liquefied ink without generating the excess and unnecessary heat amount in the recording device.

In this aspect, the first printer may be further provided with a guide member, at one end of which the frame member is disposed, for guiding the recording device in the main scan direction. And that, the controller may further control the moving device to move and locate the recording device at another end of the guide member when the another heating device maintains the liquefied state of the liquefied ink while the recording device is in the condition of waiting for recording the record information.

According to this aspect, the recording device is guided in the main scan direction by the guide member. When the another heating device maintains the liquefied state of the liquefied ink while the recording device is in the condition of waiting for recording the record information, under the control of the controller, the moving device moves and locates the recording device at another end of the guide member. Thus, during the waiting condition, the alternative current is not supplied to the heating device, so that the temperature of the liquefied ink can be prevented from being excessively increased.

In another aspect of the first printer, the first printer may be further provided with: a detecting device for detecting an existence or non-existence of the liquefied ink while recording the record information by the recording device; and an ink supplying device for supplying the solid ink to the recording device when the non-existence of the liquefied ink is detected by the detecting device. Thus, the solid ink in an adequate amount can be automatically and speedily supplied to the recording device.

In this aspect, the ink supplying device may be located at an ink supplying position, and the controller may further control the moving device to move the recording device to the ink supplying position when the non-existence of the liquefied ink is detected by the detecting device.

According to this aspect, when the non-existence of the liquefied ink is detected by the detecting device, the moving device moves the recording device to the ink supplying position under the control of the controller, so that the solid ink in an adequate amount can be automatically and speedily supplied at the ink supplying position.

In another aspect of the first printer, the fixed terminal is provided with an electrically conductive and elastic material, and the moving terminal contacts with the fixed terminal such that the moving terminal deforms the fixed terminal when the alternative current is supplied therethrough.

According to this aspect, when the alternative current is supplied, the moving terminal contacting with the fixed terminal deforms the fixed terminal. Thus, the contact failure between the moving terminal and the fixed terminal can be certainly avoided, so that the alternative current can be reliably supplied to the heating device.

In another aspect of the first printer, the recording device records the record information by means of an ink jet method.

According to this aspect, it is possible to record the record information with high quality by means of the ink jet method.

The above second object of the present invention can be achieved by a second information recording method by using a printer. The printer is provided with: a heating device for heating a solid ink to dissolve the solid ink into a liquefied ink; a recording device, on which the heating device is provided, for recording record information onto a record sheet by use of the liquefied ink; an ink supplying device for storing the solid ink and supplying the solid ink therefrom to the recording device; and a moving device for moving the recording device. The second information recording method is provided with the processes of: moving the recording device by the moving device to an ink supplying position where the solid ink is to be supplied to the recording device; supplying the solid ink to the recording device by the ink supplying device at the ink supplying position; moving the recording device by the moving device to an ink dissolving position, where the solid ink is to be dissolved into the liquefied ink and which is different from the ink supplying position; dissolving the solid ink to the liquefied ink by the heating device at the ink dissolving position; moving the recording device in a main scan direction of the record sheet by the moving device after the solid ink is dissolved by the heating device; and recording the record information by use of the dissolved ink onto the record sheet by the recording device while the recording device is moved in the main scan direction by the moving device.

According to the second information recording method, the recording device is moved by the moving device to the ink supplying position. Then, the solid ink is supplied to the recording device by the ink supplying device at the ink supplying position. Then, the recording device is moved by the moving device to the ink dissolving position. Then, the solid ink is dissolved to the liquefied ink by the heating device at the ink dissolving position. Then, after the solid ink is dissolved by the heating device, the recording device is moved in the main scan direction by the moving device. While the recording device is moved in the main scan direction by the moving device in this manner, the record information is recorded by use of the dissolved ink onto the record sheet by the recording device.

Accordingly, since the solid ink is dissolved at the ink dissolving position, which is different and thus spaced from the ink supplying position where the ink supplying device is located, the heat amount conducted from the heating device to the ink supplying device can be certainly reduced. Thus, it is possible to prevent the solid ink stored in the ink supplying device from being softened or dissolved to be stuck in the ink supplying device. Accordingly, the solid ink can be reliably supplied to the recording device by the ink supplying device, and the recording operation by the recording device can be reliably executed.

In one aspect of the second information recording method, the process of moving the recording device to the ink dissolving position is performed when a main power for the printer is turned on. Thus, even in a case that the once liquefied ink is solidified again in the recording device until the main power is turned on, this solidified ink can be promptly dissolved again.

In another aspect of the second information recording method, the second recording method is further provided with the process of detecting an existence or non-existence of the liquefied ink while recording the record information by the recording device, wherein the recording device is moved to the ink supplying position by the moving device and the solid ink is supplied to the recording device by the ink supplying device when the non-existence of the liquefied ink is detected by the detecting process. Thus, the solid ink in an adequate amount can be automatically and speedily supplied to the recording device.

In another aspect of the second information recording method, the ink dissolving position is located outside of a printing range where the record sheet is transported.

According to this aspect, since the ink dissolving position is located outside of the printing range, it is possible to prevent the dissolved ink from being dropped onto the record sheet while the solid ink is being dissolved by the heating device.

In another aspect of the second information recording method, the second information recording method is further provided with the processes of: moving the recording device to a position different from the ink supplying position while the recording device is in a condition of waiting for recording the record information; and maintaining a liquefied state of the liquefied ink while the recording device is in the condition of waiting for recording the record information.

According to this aspect, the recording device is moved to a position different from the ink supplying position while the recording device is in the waiting condition. Then, during this waiting condition, the liquefied state of the liquefied ink is maintained. Thus, it is possible to promptly restart the actual recording operation after the waiting condition by use of the liquefied ink which has been maintained in the liquefied state, and to prevent the solid ink stored in the ink supplying device from being softened or dissolved due to the heat applied during this waiting condition.

The above mentioned second object of the present information can be also achieved by a second printer provided with: a heating device for heating a solid ink to dissolve the solid ink into a liquefied ink; a recording device, on which the heating device is provided, for recording record information onto a record sheet by use of the liquefied ink; an ink supplying device for supplying the solid ink therefrom to the recording device; and a moving device for moving the recording device to an ink supplying position when the solid ink is to be supplied to the recording device by the ink supplying device, an ink dissolving position when the solid ink is to be dissolved into the liquefied ink by the heating device, and in a main scan direction of the record sheet while the record information is recorded by use of the dissolved ink onto the record sheet by the recording device after the solid ink is dissolved by the heating device.

According to the second printer, when the solid ink is to be supplied to the recording device, the recording device is moved to the ink supplying position by the moving device. Then, the solid ink is supplied by the ink supplying device to the recording device. Then, the recording device is moved to the ink dissolving position. Then, the solid ink is heated by the heating device, and is dissolve into the liquefied ink. Next, while the recording device is moved in the main scan direction by the moving device, the record information is recorded onto the record sheet by use of the liquefied ink, by the recording device.

Accordingly, in the same manner as the aforementioned second information recording method of the present invention, it is possible to prevent the solid ink stored in the ink supplying device from being softened or dissolved to be stuck in the ink supplying device. Accordingly, the solid ink can be reliably supplied to the recording device by the ink supplying device, and the recording operation by the recording device can be reliably executed.

In one aspect of the second printer, the ink dissolving position is located outside of a printing range where the record sheet is transported. Thus, it is possible to prevent the dissolved ink from being dropped onto the record sheet while the solid ink is being dissolved by the heating device.

In another aspect of the second printer, the moving device moves the recording device to a position different from the ink supplying position while the recording device is in a condition of waiting for recording the record information, and the heating device maintains a liquefied state of the liquefied ink while the recording device is in the condition of waiting for recording the record information. Thus, it is possible to promptly restart the actual recording operation after the waiting condition by use of the liquefied ink which has been maintained in the liquefied state, and to prevent the solid ink stored in the ink supplying device from being softened or dissolved due to the heat applied during this waiting condition.

In another aspect of the second printer, the ink supplying position is positioned at one end in the main scan direction within a movable range of the recording device, and the ink dissolving position is positioned at the other end in the main scan direction within the movable range of the recording device.

According to this aspect, since the ink supplying position and the ink dissolving position are certainly distant from each other by a distance corresponding to the movable range, the heat amount conducted from the heating device to the ink supplying device can be practically minimized.

In another aspect of the second printer, the second printer is further provided with a detecting device for detecting an existence or non-existence of the liquefied ink while recording the record information by the recording device. And that, the moving device moves the recording device to the ink supplying position and the ink supplying device supplies the solid ink to the recording device when the non-existence of the liquefied ink is detected by the detecting device. Thus, the solid ink in an adequate amount can be automatically and speedily supplied to the recording device.

In another aspect of the second printer, the recording device records the record information by means of an ink jet method.

According to this aspect, it is possible to record the record information with high quality by means of the ink jet method.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENT

Preferred embodiments for the present invention are explained with reference to the drawings.

1. First Embodiment

A first embodiment described below is an embodiment in which the present invention is applied to a printer for dissolving a solid ink to a liquefied state and then performing a recording operation by an ink jet method using the liquefied ink.

(1-I) Configuration and Operation of Main Portion

Figure 1:
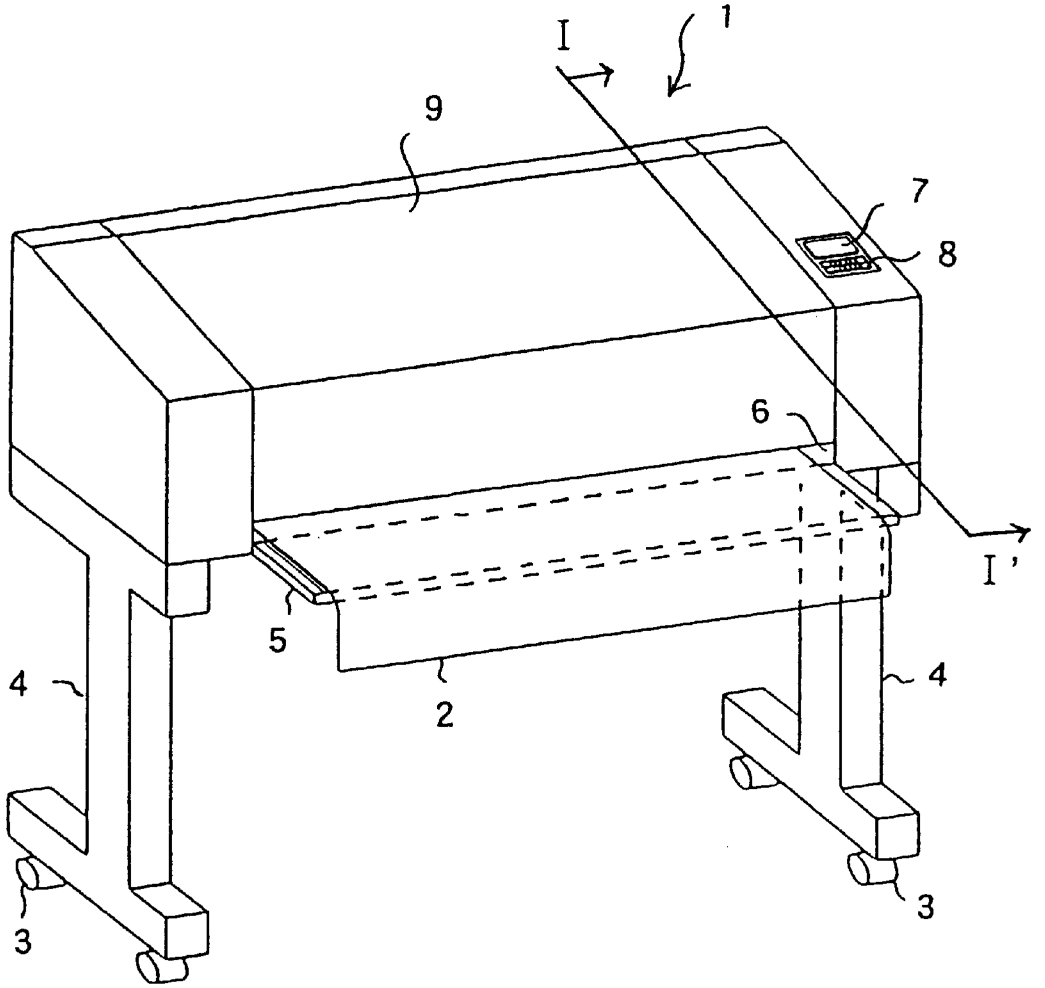
FIG. 1 is a perspective view showing an appearance of a printer as a first embodiment of the present invention.
Figure 3:
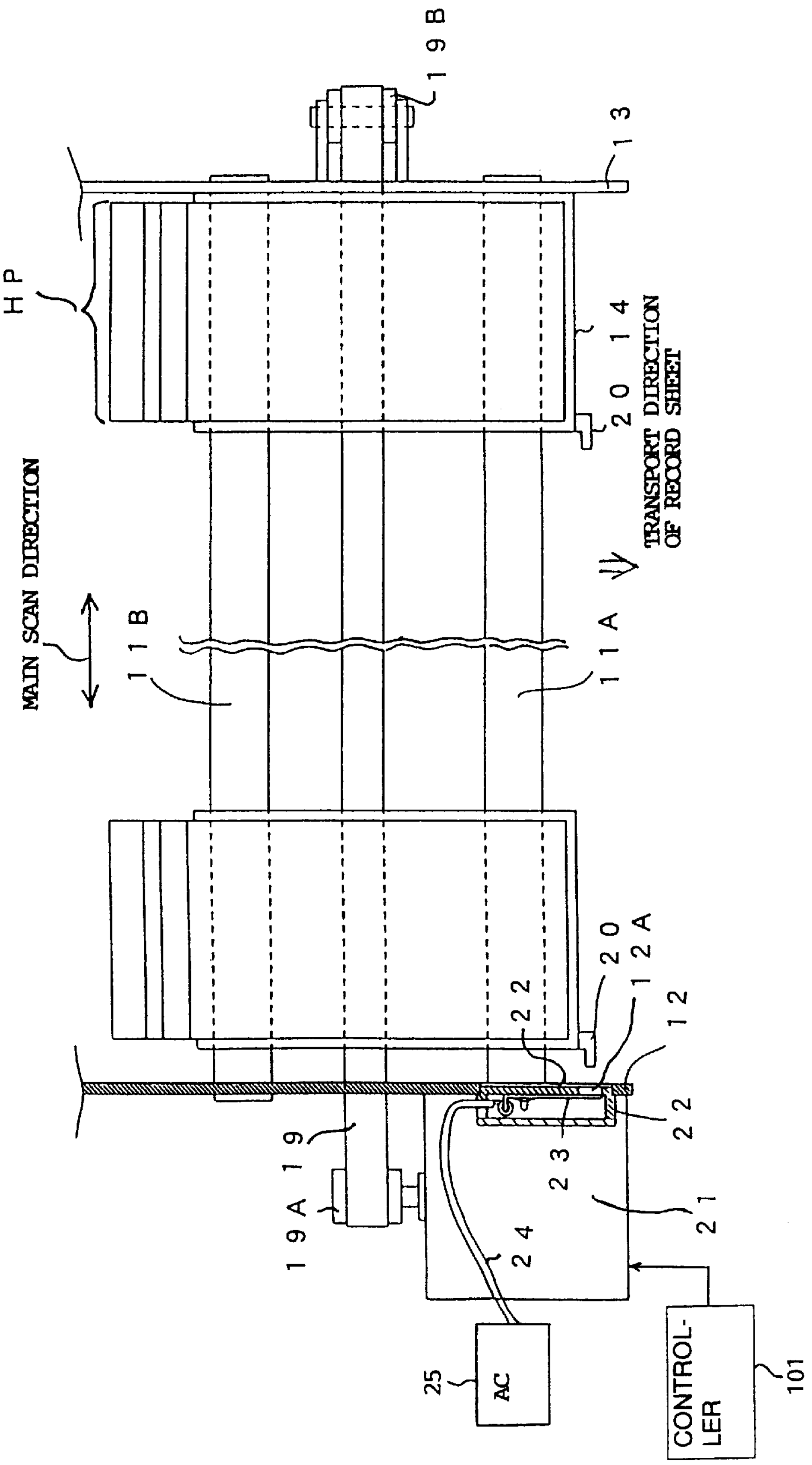
FIG. 3 is a plan view showing an inside of the printer in the first embodiment.
Figure 4:
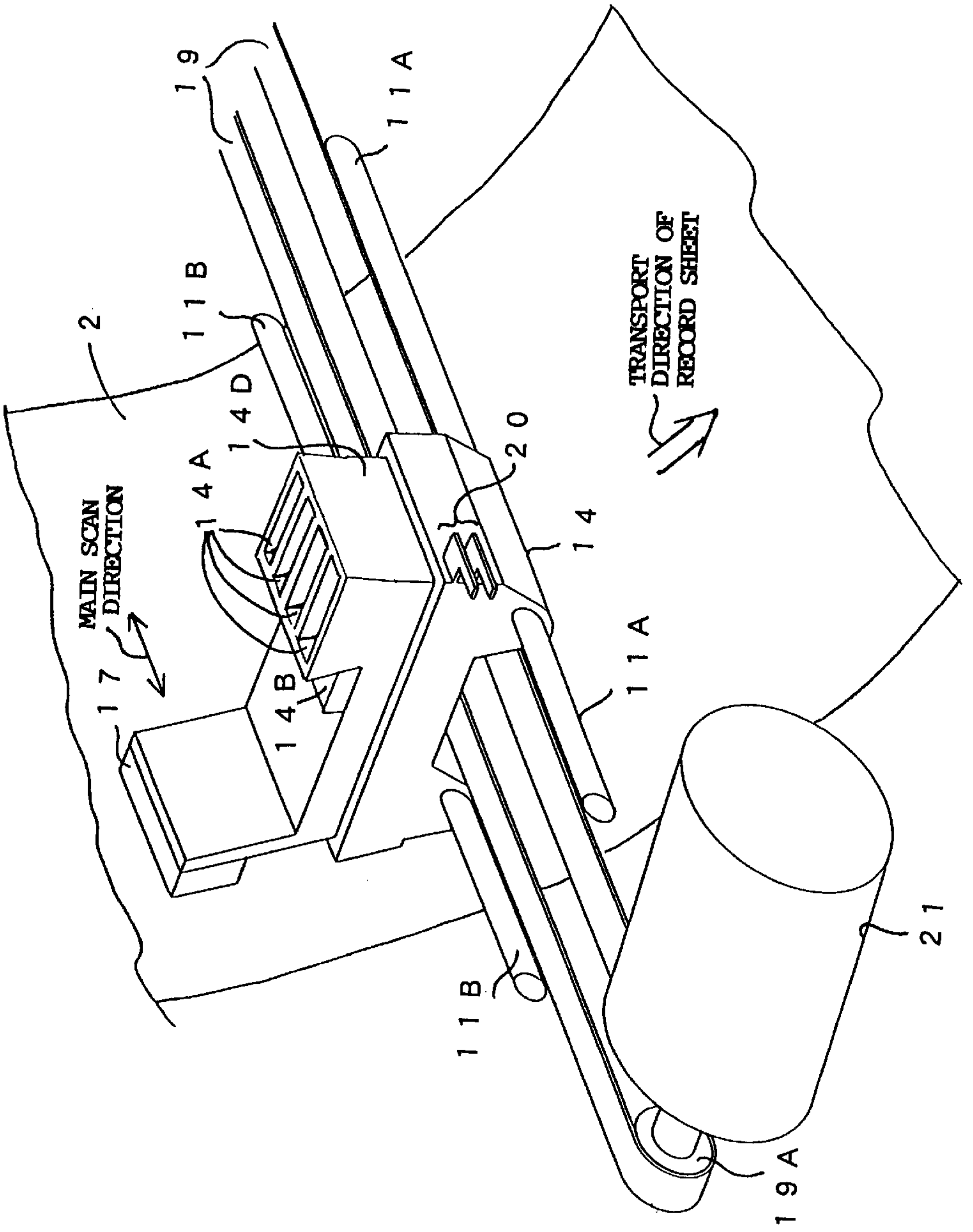
FIG. 4 is a perspective view showing a portion in relation to a driving mechanism of a carriage of the printer in the first embodiment.
Figure 5:
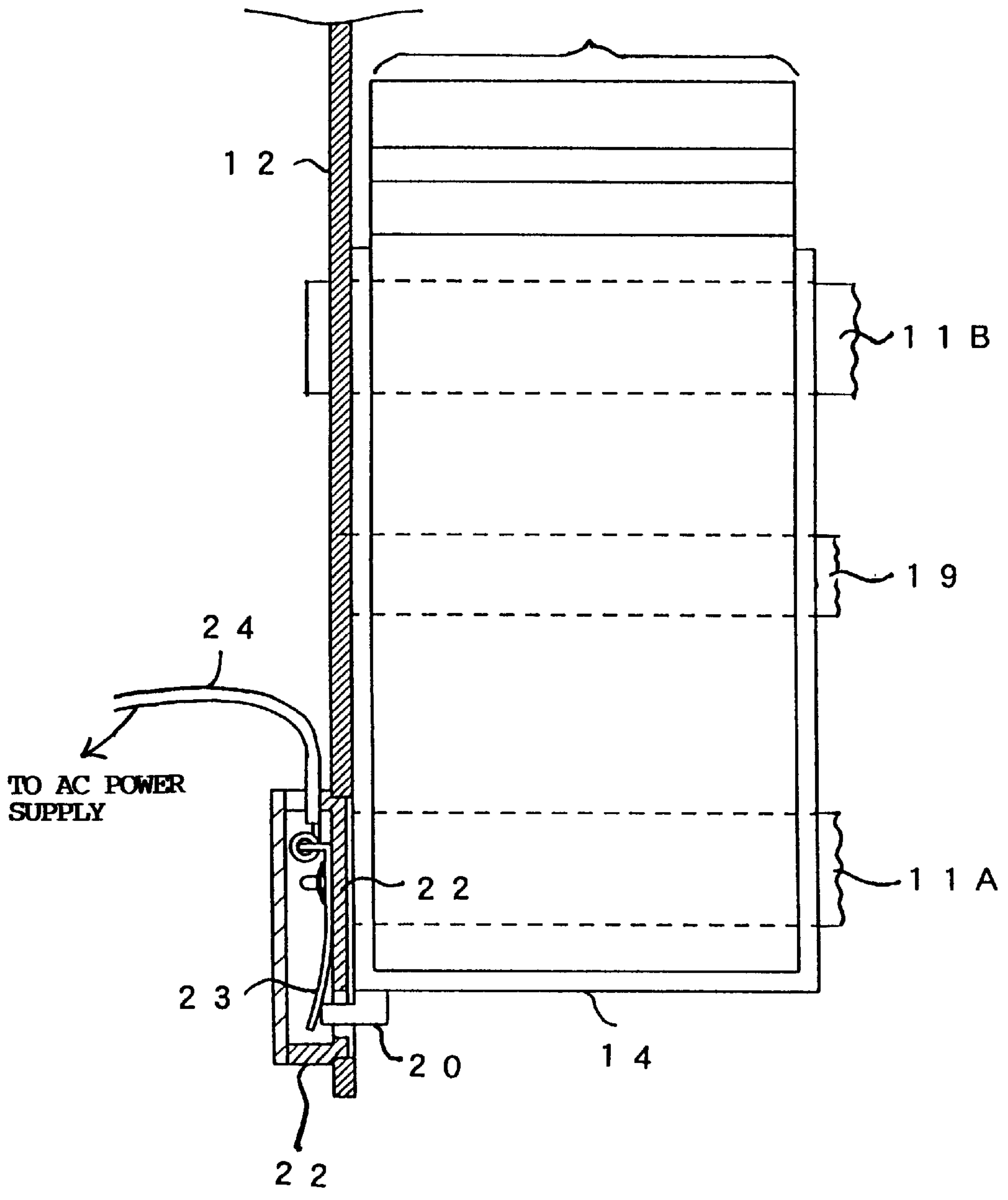
FIG. 5 is a plan view showing a portion to which an alternative current is applied in the printer in the first embodiment.
Figure 6:
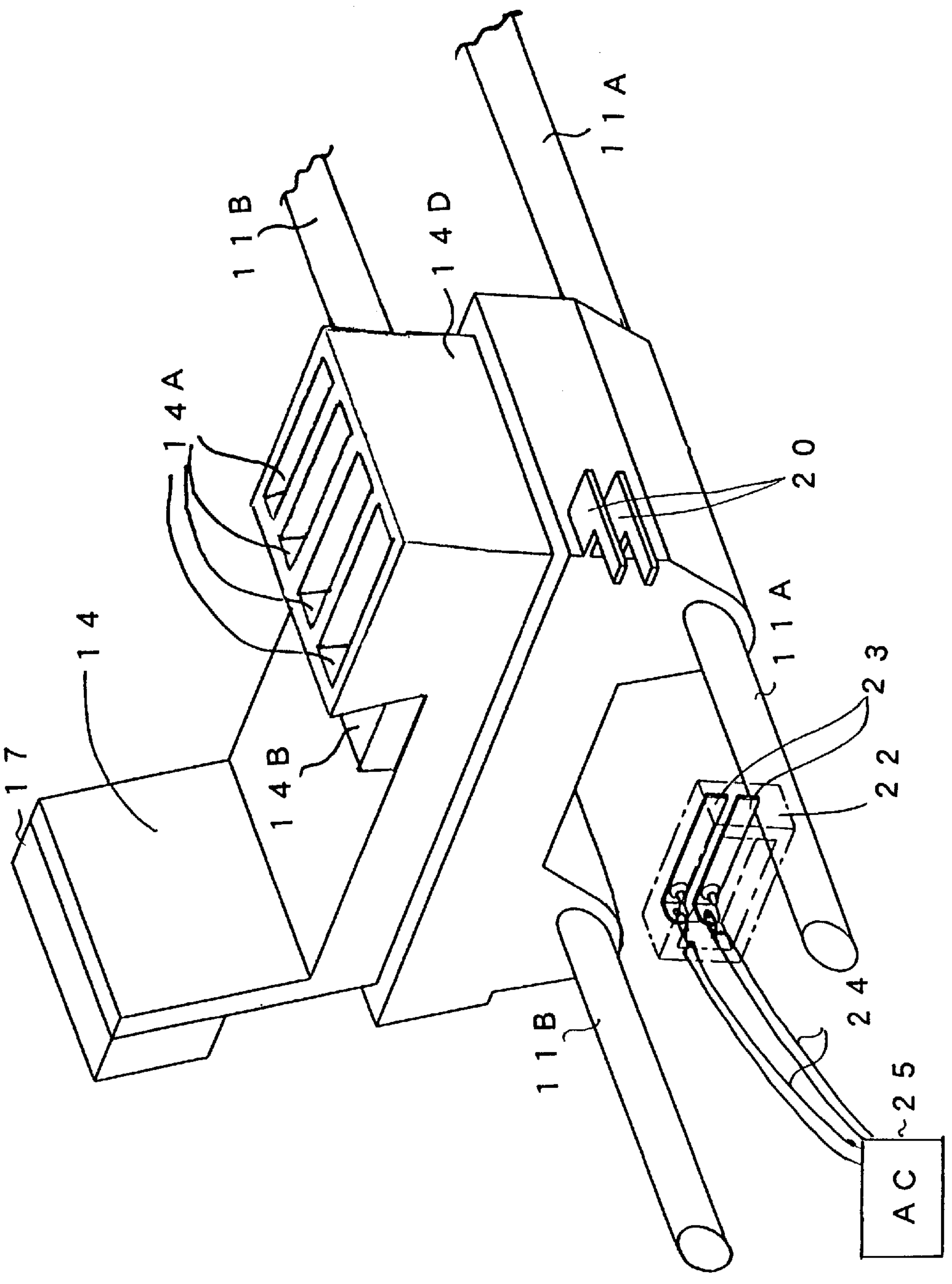
FIG. 6 is a perspective view showing a relation between a terminal and a receptacle in the printer in the first embodiment.

At first, a configuration of a printer according to the first embodiment and operations of a main portion thereof are explained with reference to FIGS. 1 to 6. FIG. 1 is a perspective view showing the appearance of the printer according to the embodiment, FIG. 2 is a A–A' sectional view of FIG. 1 in the first embodiment, FIG. 3 is a plan view showing an inner configuration of the printer when a cover 9 described later is removed, FIG. 4 is a perspective view showing a portion in relation to a driving mechanism to move a carriage 14 described later, FIG. 5 is a plan view showing a portion to which an alternative current is applied, and FIG. 6 is a perspective view showing a relation between a receptacle 23 and a carriage terminal 20 described later.

As shown in FIG. 1, a printer 1 of the embodiment is constructed so as to print and output a record sheet 2 having a size equal to or more than an A0 size. A pair of legs 4 each having a pair of casters 3 are disposed at a bottom side of the printer 1. A record sheet discharge port 6 from which the record sheet 2 is discharged and an discharge tray 5 for retaining the discharged record sheet 2 are disposed at a front surface side of the printer 1. The cover 9 which can be opened and closed so as to perform an inner maintenance of the printer 1 and the like, a display 7 for displaying various states and an operating section 8 for performing predetermined operations are disposed at a top surface side of the printer 1. A controller composed of a micro computer for controlling the printer 1 as a whole and the like is mounted inside of the operating section 8.

Next, an inner configuration of the printer 1 is explained with reference to FIGS. 2 and 3.

Figure 2:
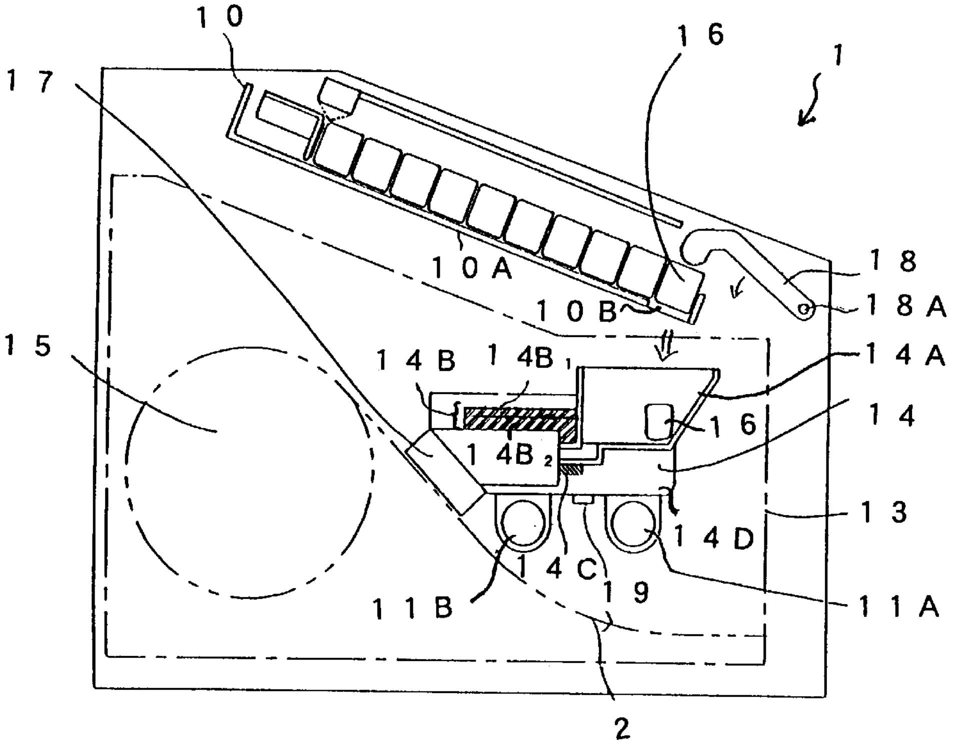
FIG. 2 is a sectional view showing an inside of the printer in the first embodiment.

As in the sectional view shown in FIG. 2, the printer 1 is roughly provided with a carriage 14 servicing as a recording device for dissolving solid inks 16 and actually performing a recording operation on the record sheet 2, and an ink supplying section 10 for retaining the solid inks 16 and further supplying them to the carriage 14, one by one.

As in the side view shown in FIG. 2, the carriage 14 for actually performing the recording operation by using the ink jet method is provided with: a record head 17 for performing the recording operation on the record sheet 2 by using the ink jet method; an ink dissolving section 14A for heating and dissolving the solid ink 16 supplied by the ink supplying section 10 to thereby generate the liquefied ink and supply it to the record head 17; an ink tank 14D for transiently holding the generated liquefied ink; a heater 14B servicing as a heating device for dissolving the supplied solid ink 16 by heating the ink dissolving section 14A; and an ink remaining amount detecting sensor 14C for detecting a remaining amount of the liquefied ink. The heater 14B is provided with a direct current heater $\mathbf{14B_1}$ heated by a direct current described later and an alternative current heater $\mathbf{14B_2}$ heated by an alternative current described later. The heater 14B is constituted by the direct current heater $\mathbf{14B_1}$ and the alternative current heater $\mathbf{14B_2}$ which overlap to each another with a heat-proof insulation therebetween.

On the other hand, as in the sectional view shown in FIG. 2, the ink supplying section 10 has a retainer 10A for retaining in a line the solid inks 16 for each color (for four colors of cyan, magenta, yellow and black used for the recording operation). A hole 10B having a size, through which only one solid ink 16 can be passed, is opened at a tip of the retainer 10A for each color. When the carriage 14 is located just under the ink supplying section 10, the solid ink 16 is dropped into the ink supplying section 14A of the carriage 14 by the rotation (counterclockwise rotation) of a supply lever 18 (disposed for each color) around an axis 18A as a center. The solid ink 16 is supplied to the carriage 14 by this operation.

On the other hand, as in the plan view shown in FIG. 3, the carriage 14 performs the recording operation while moving in the left and right directions of FIG. 3 (a main scan direction for the record sheet 2) on two guide bars 11A and 11B bridged between frames 12 and 13 disposed at both sides of the printer 1. At this time, since the record sheet 2 stored as a roll 15 (refer to FIG. 2) is transported out in a front direction (sub-scan direction) of FIG. 3, the recording operation on the record sheet 2 is performed in conjunction with the operation of the carriage 14.

The ink supplying section 10 is disposed at a position closer to the frame 12 at the right ends of the guide bars 11A and 11B. Then, since the carriage 14 is moved to be located just under this position, the solid ink 16 is supplied for each color. Incidentally, FIG. 2 shows the situation that the carriage 14 is located just under the ink supplying section 10 (this position is referred to as a home position HP of the carriage 14. Refer to FIG. 3), and also shows the situation when the solid ink 16 is supplied to the carriage 14.

On the other hand, as for the movement in the main scan direction of the carriage 14, a timing belt 19 constituted by a rubber and the like is fixed on the carriage 14, as shown in FIG. 3. While the timing belt 19 is supported on pulleys 19A and 19B, it is moved by the rotation of a motor 21 (linked to a driving section (not shown)) connected to the pulley 19A. The carriage 14 is moved in the main scan direction (shown by both arrows in FIG. 3) in conjunction with this movement of the timing belt 19. That is, the movement of the carriage 14 can be freely controlled by adjusting the rotational direction and the rotational speed of the motor 21.

Moreover, the carriage terminal 20, which services as a moving terminal and is connected to the alternative current heater 14B2 (shown in FIG. 2) is formed on a left side of the carriage 14 in FIG. 3, such that the carriage terminal 20 protrudes from the left side as the carriage terminal 20. In contrast with this, an opening 12A is disposed on the frame 12 such that the carriage terminal 20 protrudes through the frame 12 to a side opposite to the carriage 14 when the carriage 14 is located at a left end of a movement range thereof in FIG. 3 (namely, a side opposite to the home position HP within the movement range of the carriage 14. This is hereafter referred to as an alternative current application position AP). On a side opposite to the carriage 14 of the opening 12A, the receptacle 23, which services as a fixed terminal and is made of an elastic body such as a phosphor bronze plate and the like at a position where the receptacle 23 can be in contact with the carriage terminal 20 when the carriage 14 is located at the alternative current application position AP, is fixed on the frame 12 through an insulator 22. This receptacle 23 is connected through a lead wire 24 to an AC (alternative current) power supply 25.

Next, the carriage 14 and a driving system for driving the carriage 14 are further explained with reference to FIG. 4.

As shown in FIG. 4, the carriage 14 has four ink dissolving sections 14A for each color. The solid inks 16 (shown in FIG. 2) supplied to the respective ink dissolving sections 14A are dissolved by the heater 14B, and transiently retained in the ink tank 14D, and then supplied to the record head 17, and accordingly the recording operation is performed. In this recording operation, the heating operation to keep the once dissolved ink in the liquefied state is performed by supplying a direct current from a direct current power supply (not shown) to the direct current heater $\mathbf{14B_1}$ (shown in FIG. 2). At this time, the alternative current is not applied to the alternative current heater $\mathbf{14B_2}$ (shown in FIG. 2).

Moreover, while the carriage 14 is supported on the guide levers 11A and 11B as mentioned above, it is moved in the main scan direction by the operations of the timing belt 19, the pulley 19A (and the pulley 19B shown in FIG. 3) and the motor 21, and accordingly the recording operation is performed.

Next, the supply of the alternative current to the alternative current heater $\mathbf{14B_2}$ resulting from the contact between the receptacle 23 and the carriage terminal 20 is explained with reference to FIGS. 5 and 6.

When the carriage 14 is located at the alternative current application position AP, the carriage terminal 20 penetrates through the opening 12A of the frame 12 to the side opposite to the carriage 14 of the frame 12, and accordingly becomes in contact with the receptacle 23. At this time, a length of the tip of the carriage terminal 20 is set such that the receptacle 23 is deformed by a predetermined amount (bent as shown in FIG. 5) and becomes in contact with the carriage terminal 20. In FIG. 5, the illustration of the motor 21 is omitted for the purpose of the evident explanation.

Next, a positional relation between the receptacle 23 and the carriage terminal 20 is as shown in FIG. 6. That is, they are constructed such that two metallic plates constituting the receptacle 23 are in respectively separately contact with the tips of the carriage terminal 20. The two metallic plates are respectively independent and connected through the lead wires 24 to the AC power supply 25. For example, a commercial 100 V, 50/60 Hz power supply or 200 V, 50/60 Hz power supply or the like can be used for this AC power supply 25.

In FIG. 6, the illustrations of the frame 12, the motor 21 and the timing belt 19 are omitted for the purpose of the evident explanation.

(1-II) Operation

Figure 7:
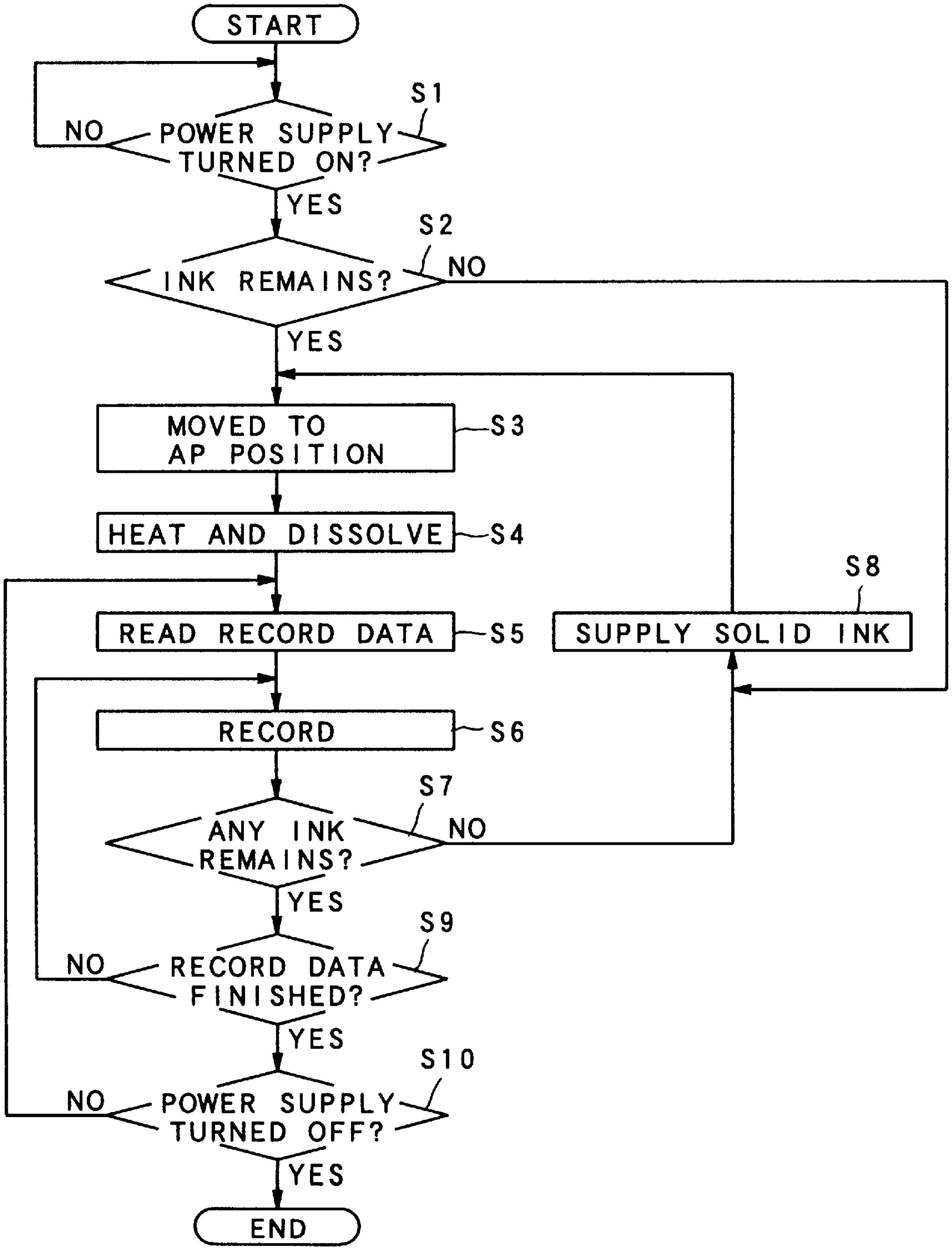
FIG. 7 is a flowchart showing operations of the printer in the first embodiment.

Next, the operations of the printer 1 as the first embodiment of the present invention are explained with reference to a flowchart shown in FIG. 7. The flowchart shown in FIG. 7 is a flowchart showing the processes mainly executed by the controller 101 mounted inside of the operating section 8.

When the recording operation is executed by the printer 1, it is firstly judged whether or not the power supply is turned on (Step S1). If it is not turned on (Step S1; NO), the printer 1 waits until it is turned on. If it is turned on (Step S1; YES), it is next judged by the ink remaining amount detecting sensor 14C whether or not the ink remains in the ink tank 14D (Step S2). If the ink does not remain (Step S2; NO), the operational flow proceeds to a step S8. Then, the carriage 14 is moved to the home position HP (located just under the ink supplying section 10) shown in FIG. 2, and receives the solid ink 16 supplied thereat (Step S8). Then, the operational flow proceeds to a step S3.

On the other hand, if the ink remains according to the judgment of the step S2 (Step S2; YES), the carriage 14 is moved to the alternative current application position AP shown in FIG. 5 (Step S3), which causes the carriage terminal 20 and the receptacle 23 to be in contact with each other. Then, the alternative current from the AC power source 25 is applied to the alternative current heater $\mathbf{14B_2}$. Accordingly, the remaining ink (normally solidified) is heated and dissolved by the alternative current heater $\mathbf{14B_2}$ and the direct current heater $\mathbf{14B_1}$ (to which the direct current is always applied, after the power supply of the printer 1 is turned on, irrespective of the position of the carriage 14) (Step S4).

When the remaining ink becomes in the liquefied state, record data to be recorded is next introduced or read into the carriage 14 (Step S5). Then, the liquefied ink is supplied to the record head 17, and thereby the recording operation is performed on the record sheet 2 on the basis of the record data (Step S6).

When waiting for the recording operation during recording at the step S6, the carriage 14 is moved to the home position HP shown in FIG. 2. Then, the liquefied ink is thermally maintained, while waiting.

Next, during recording, the non-existence of the liquefied ink is always monitored by the ink remaining amount detecting sensor 14C, and the presence or absence thereof is also judged thereby (Step S7). If there remains no ink (Step S7; NO), the carriage 14 is moved to the home position HP, and receives the supply of the solid ink 16 (Step S8). Then, the operational flow returns to the step S3. Then, the carriage 14 is moved to the alternative current application position AP, which causes the supplied solid ink 16 to be dissolved (Step S4).

On the other hand, if the ink remains (Step S7; YES), it is next judged whether or not the record data to be recorded is finished (Step S9). If it is not finished (Step S9; NO), the operational flow returns to the step S6 so as to continue the recording operation (Step S6).

If the record data is finished at the judgment of the step S9 (Step S9; YES), it is next judged whether or not the power supply of the printer 1 is turned off (Step S10). If it is not turned off (Step S10; NO), the operational flow returns to the step S5, and next record data is read in. If there is no record data to be next read in, the carriage 14 is moved to the home position HP, and waits until the next record data is inputted, while the liquefied ink is thermally maintained.

If it is judged at the judgment of the step S10 that the power supply is turned off (Step S10; YES), the process is ended as it is.

The record data is recorded onto the record sheet 2 by repeating the above mentioned operations.

As mentioned above, according to the operations of the printer 1 as the first embodiment, only when the solid ink 16 and the ink solidified in the ink dissolving section 14A (hereafter, referred to as the solidified ink) are dissolved, the carriage terminal 20 and the receptacle 23 are made in contact with each other so that the alternative current is applied to the alternative current heater $\mathbf{14B_2}$, which results in the dissolving operation. Hence, the solid ink 6 and the solidified ink can be quickly dissolved.

Only when the solid ink 6 and the solidified ink have been dissolved, the alternative current is applied. Thus, it is possible to restrain the increase of the electric power consumption resulting from the regular application of the alternative current.

Further, the movement of the carriage 14 enables the control of the application and shutoff of the alternative current to thereby simplify the control of the application of the alternative current.

When the power supply of the printer 1 is turned on, the alternative current is applied. Hence, even if the ink in the carriage 14 is already solidified before the power supply is turned on, this can be quickly dissolved.

When the carriage 14 is in the waiting state and the dissolved ink is thermally maintained to keep it in the liquefied state, the carriage 14 is located at the home position HP. Thus, the alternative current is not applied in the waiting state to thereby prevent the temperature of the ink from rising extremely and uselessly in the waiting state.

The receptacle 23 is made of the elastic material, and further the carriage terminal 20 becomes in contact with the receptacle 23 such that it is deformed when the alternative current is applied. Hence, the alternative current can be applied to the alternative current heater 14$B_2$ without defective electrical contact.

The carriage 14 records the recording operation by using the ink jet type to thereby obtain the clearer record result.

2. Second Embodiment

A second embodiment described below is an embodiment in which the present invention is applied to a printer for dissolving a solid ink to a liquefied state and then performing a recording operation by an ink jet method using the liquefied ink.

(2-I) Configuration and Operation of Main Portion

Figure 8:
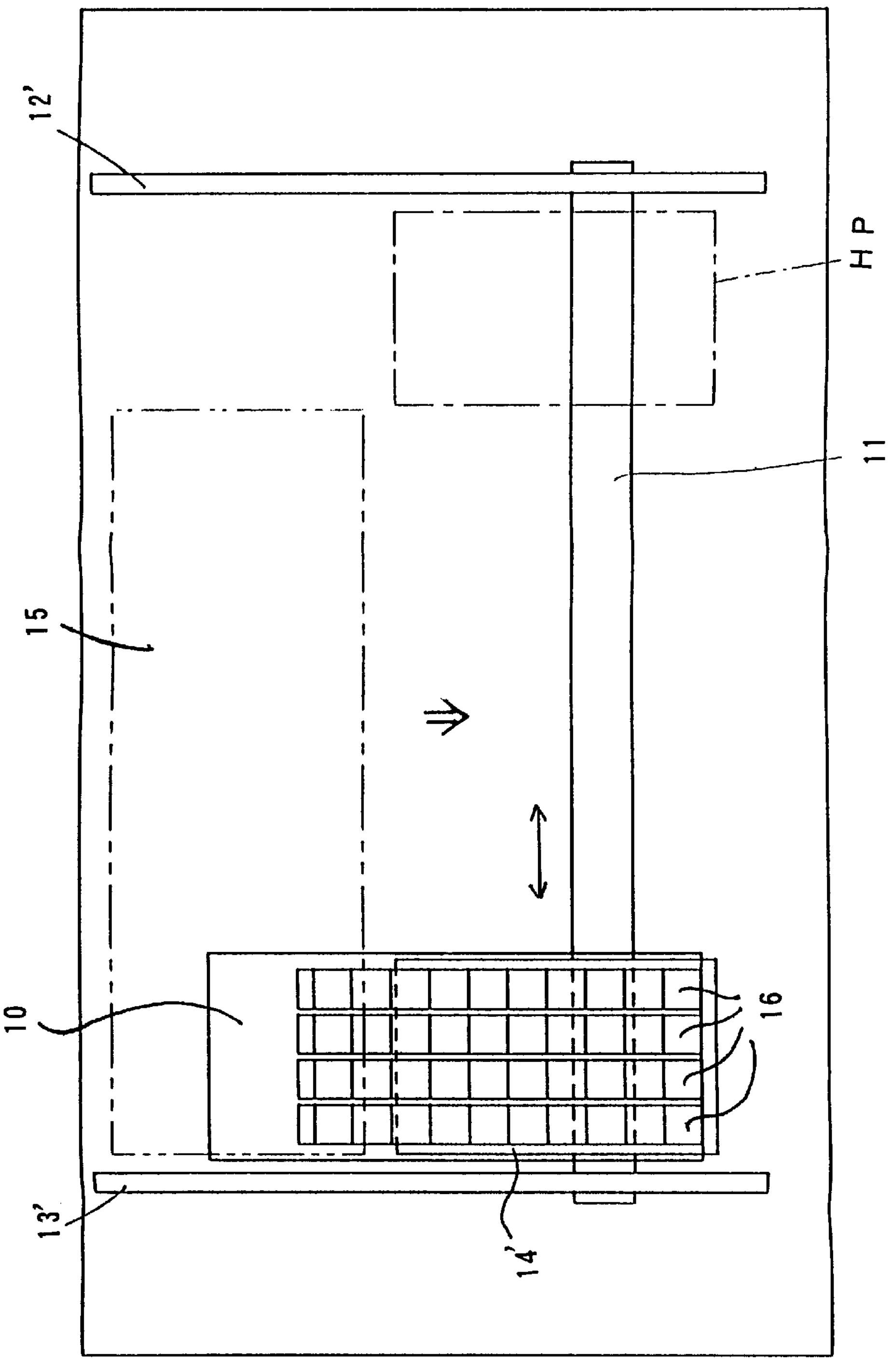
FIG. 8 is a plan view showing an inside of a printer in a second embodiment.
Figure 9:
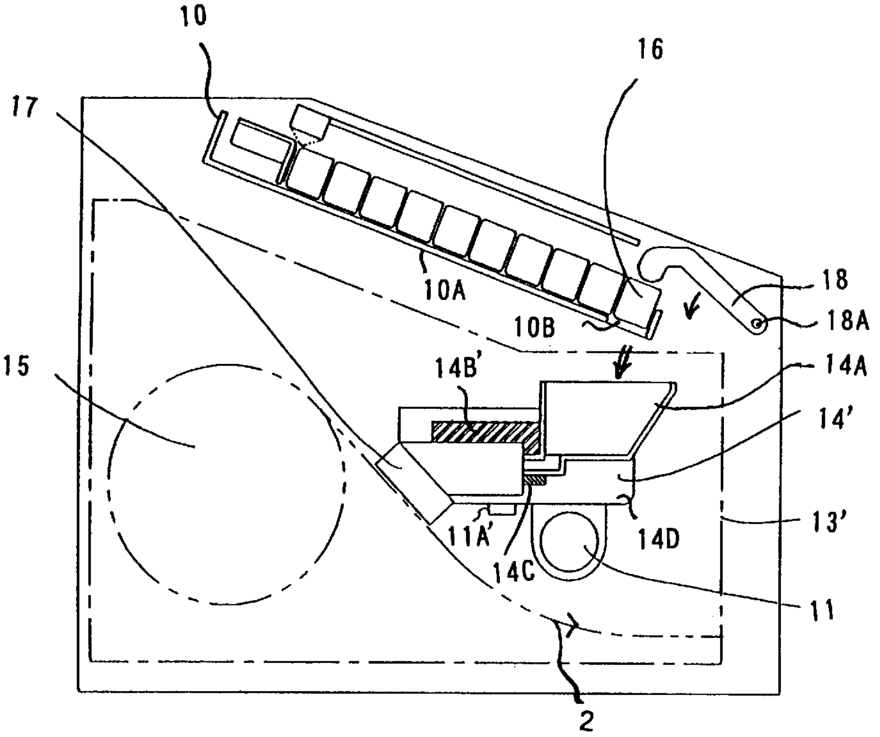
FIG. 9 is a sectional view showing an inside of the printer in the second embodiment.
Figure 10:
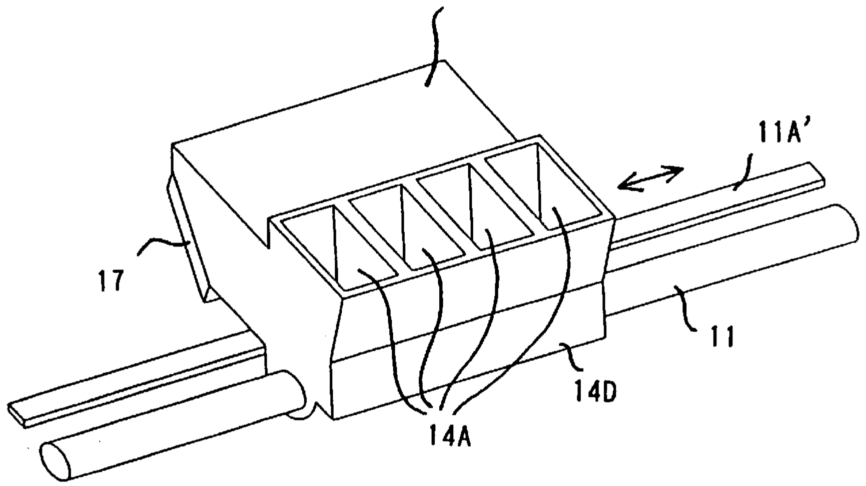
FIG. 10 is a perspective view showing a portion in relation to a driving mechanism of a carriage of the printer in the second embodiment.

At first, a configuration of a printer according to the second embodiment and operations of a main portion thereof are explained with reference to FIGS. 1, 8 to 10. FIG. 8 is a plan view showing an inner configuration of the printer when the cover 9 is removed in the second embodiment, FIG. 9 is a A–A' sectional view of FIG. 1 in the second embodiment, and FIG. 10 is a perspective view showing a portion in relation to a driving mechanism to move a carriage 14' in the second embodiment. In FIGS. 8 to 10, the same constitutional elements as those in FIGS. 2 to 6 in the first embodiment carry the same reference numerals and the explanations thereof are omitted.

Since the external structure of the second embodiment is the same as that of the first embodiment shown in FIG. 1, the explanation thereof is omitted. Thus, the internal structure of the printer 1 is firstly explained with reference to FIGS. 8 and 9.

As shown in FIGS. 8 and 9, the carriage 14' performs the recording operation while moving in the left and right directions of FIG. 8 (a main scan direction for the record sheet 2) on a guide bar 11 bridged between frames 12' and 13' disposed at both sides of the printer 1. At this time, since the record sheet 2 stored as the roll 15 (refer to FIG. 9) is transported out in a front direction (sub-scan direction) of FIG. 8, the recording operation on the record sheet 2 is performed in conjunction with the operation of the carriage 14'.

At the left edge of the guide 11 close to the frame 13' in FIG. 8, there is disposed the ink supplying section 10, which has the retainer 10A for retaining the solid inks 16 for four colors of cyan, magenta, yellow and black in one line.

As in the side view shown in FIG. 9, the carriage 14' for actually performing the recording operation by using the ink jet method is provided with: the record head 17; the ink dissolving section 14A; the ink tank 14D; a heater 14B' for dissolving the supplied solid ink 16 by heating the ink dissolving section 14A; and the ink remaining amount detecting sensor 14C. The heater 14B' is not provided with the direct current heater as in the first embodiment, but is provided with the alternative current heater 14. However, the heater 14B' may be provided with the alternative current heater as well as the direct current heater in the same manner as the first embodiment, so as to have the same advantageous effect as the first embodiment in addition to the unique advantageous effect of the second embodiment as described later.

On the other hand, as in the sectional view shown in FIG. 9, the ink supplying section 10 has the retainer 10A, at the top of which the hole 10B is opened for each color. Thus, in the same manner as in the first embodiment, when the carriage 14 is located just under the ink supplying section 10, the solid ink 16 is dropped into the ink supplying section 14A of the carriage 14' by the rotation of the supply lever 18 around the axis 18A, so as to supply the solid ink 16 to the carriage 14'.

Incidentally, FIGS. 8 and 9 show the situation that the carriage 14' is located just under the ink supplying section 10, and also show the situation when the solid ink 16 is supplied to the carriage 14'.

As shown in FIG. 10, the carriage 14' has the four ink dissolving sections 14A for each color. A timing belt 11A' moved along the guide 11 by a motor (not shown) is fixed on the carriage 14', so that the recording operation is performed for each color, while the carriage 14' is held on the guide 11 and moved in the main scan direction (shown by both arrows in FIGS. 8 and 10) by the timing belt 11A'.

Moreover, in the second embodiment, the carriage 14 is controlled so as to be located at the home position HP (a position beyond a transport route of the record sheet 2, and located in the vicinity of the frame 12') shown in FIG. 8, when the supplied solid ink 16 is dissolved, or in a waiting state at which the recording operation is not performed (thermally maintained at a predetermined temperature to keep the liquefied state of the ink).

(2-II) Operation

Figure 11:
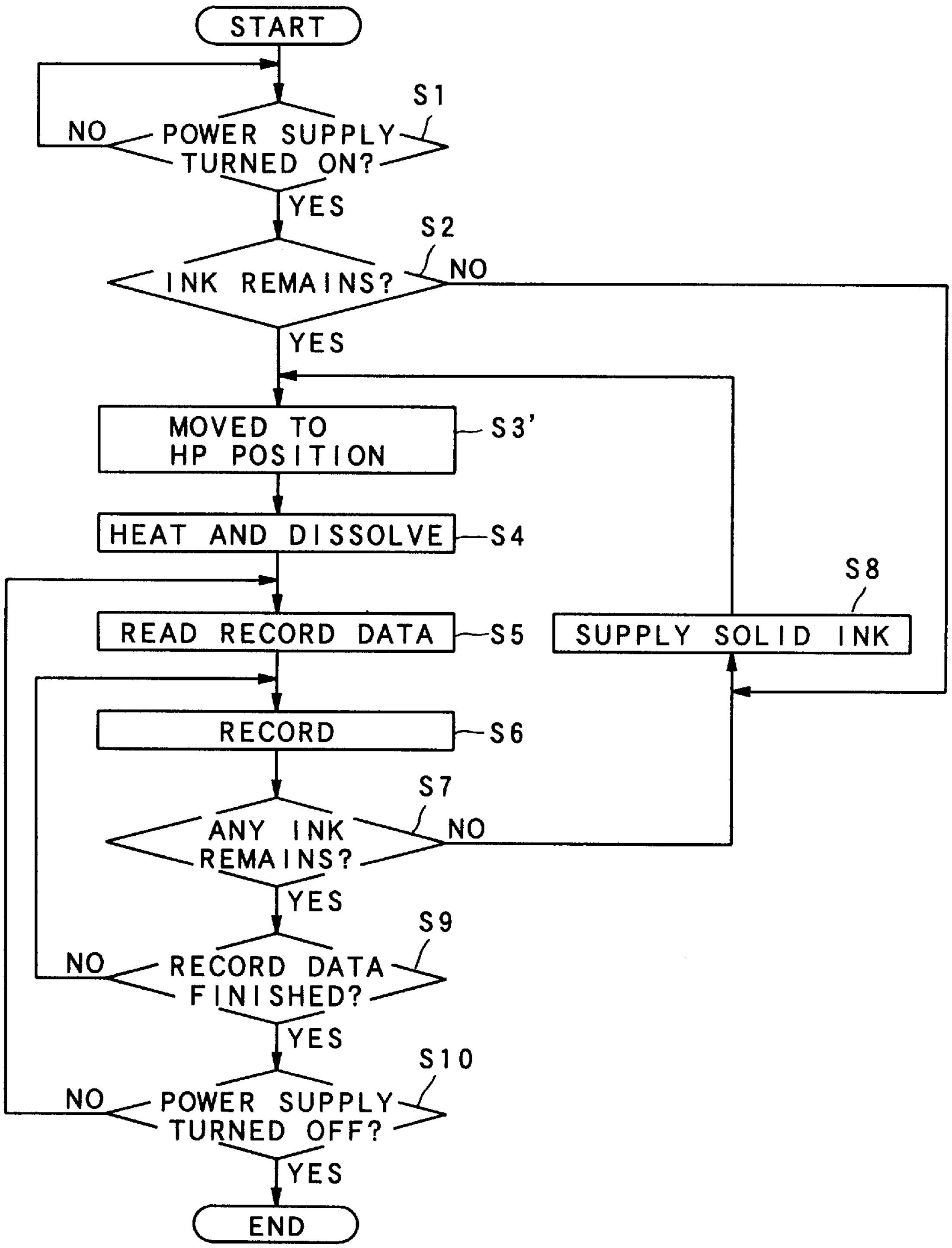
FIG. 11 is a flowchart showing operations of the printer in the second embodiment.

Next, the operations of the printer 1 as the second embodiment of the present invention are explained with reference to a flowchart shown in FIG. 11. The flowchart shown in FIG. 11 is a flowchart showing the processes mainly executed by the above mentioned controller 101 mounted inside of the operating section 8. In FIG. 11, the same steps as those in FIG. 7 of the first embodiment carry the same step numbers and the explanations thereof are omitted.

As shown in FIG. 11, the steps S1 and S2 are firstly, performed in the same manner as the first embodiment. Then, if the ink remains according to the judgment of the step S2 (Step S2; YES), the carriage 14 is moved to the home position HP shown in FIG. 8 (Step S3). Then, the operation flow proceeds to the step S4, and the steps S4 to S10 are executed, and the process is ended in the same manner as the first embodiment.

As explained above, according to the operations of the printer 1 in the second embodiment, since the carriage 14' dissolves the solid ink 16 at the home position HP, the amount of the heat conduction to the ink supplying section 10 for dissolving the solid ink 16 can be reduced, to thereby prevent the softening of the solid ink 16 retained in the ink supplying section 10.

Moreover, even when the carriage 14' waits for the recording operation, it is moved to the home position HP and waits thereat. Thus, even if the heating operation to keep the ink in the liquefied state is performed in the waiting state of the carriage 14', it is still possible to prevent the softening of the solid ink 16 retained in the ink supplying section 10.

Furthermore, since the home position HP is a position beyond the range of the transport route of the record sheet 2, it is possible to prevent the ink dissolved during dissolving the solid ink 16 from dropping onto the record sheet 2 and contaminating the record sheet 2.

Incidentally, in the above mentioned first and second embodiments, the cases have been explained in which the recording operation is performed for the record sheet 2 retained in a form of the roll. However, the present invention is not limited thereto. Instead, the present invention may be applied to a case where the recording operation is performed for a so-called cut-form sheet which is cut to a predetermined size.

Moreover, in the above mentioned first and second embodiments, the cases have been explained where the present invention is applied to the printer for performing the recording operation by using the ink jet type. However, the present invention is not limited thereto. Instead, the present invention can be widely applied to a printer for retaining the solid ink and further dissolving it to thereby perform the recording operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information recording method by using a printer comprising:

a heating device for heating a solid ink to dissolve the solid ink into a liquefied ink; a recording device, on which said heating device is provided, for recording record information onto a record sheet by use of the liquefied ink; an ink supplying device for storing the solid ink and supplying the solid ink therefrom to said recording device; and a moving device for moving said recording device, said method comprising the processes of:

moving said recording device by said moving device to an ink supplying position where the solid ink is to be supplied to said recording device;

supplying the solid ink to said recording device by said ink supplying device at the ink supplying position;

moving said recording device by said moving device to an ink dissolving position, where the solid ink is to be dissolved into the liquefied ink and which is different from the ink supplying position;

dissolving the solid ink to the liquefied ink by said heating device at the ink dissolving position which is within a moving range of said recording device and not dissolving the solid ink to the liquefied ink by said heating device within the moving range other than the ink dissolving position;

moving said recording device in a main scan direction of the record sheet by said moving device after the solid ink is dissolved by said heating device; and recording the record information by use of the dissolved ink onto the record sheet by said recording device while said recording device is moved in the main scan direction by said moving device.

2. A method according to claim 1, wherein said process of moving said recording device to the ink dissolving position is performed when a main power for said printer is turned on.

3. A method according to claim 1, wherein the ink dissolving position is located outside of a printing range where the record sheet is transported.

4. An information recording method by using a printer comprising: a heating device for heating a solid ink to dissolve the solid ink into a liquefied ink; a recording device, on which said heating device is provided, for recording record information onto a record sheet by use of the liquefied ink, an ink supplying device for storing the solid ink and supplying the solid ink therefrom to said recording device; and a moving device for moving said recording device, said method comprising the processes of:

moving said recording device by said moving device to an ink supplying position where the solid ink is to be supplied to said recording device;

supplying the solid ink to said recording device by said ink supplying device at the ink supplying position;

moving said recording device by said moving device to an ink dissolving position, where the solid ink is to be dissolved into the liquefied ink and which is different from the ink supplying position;

dissolving the solid ink to the liquefied ink by said heating device at the ink dissolving position;

moving said recording device in a main scan direction of the record sheet by said moving device after the solid ink is dissolved by said heating device;

recording the record information by use of the dissolved ink onto the record sheet by said recording device while said recording device is moved in the main scan direction by said moving device; and detecting an existence or non-existence of the liquefied ink while recording the record information by said recording device, wherein said recording device is moved to the ink supplying position by said moving device and the solid ink is supplied to said recording device by said ink supplying device when the non-existence of the liquefied ink is detected by said detecting process.

5. An information recording method by using a printer comprising: a heating device for heating a solid ink to dissolve the solid ink into a liquefied ink; a recording device, on which said heating device is provided, for recording record information onto a record sheet by use of the liquefied ink; an ink supplying device for storing the solid ink and supplying the solid ink therefrom to said recording device; and a moving device for moving said recording device, said method comprising the processes of:

moving said recording device by said moving device to an ink supplying position where the solid ink is to be supplied to said recording device;

supplying the solid ink to said recording device by said ink supplying device at the ink supplying position;

moving said recording device by said moving device to an ink dissolving position, where the solid ink is to be dissolved into the liquefied ink and which is different from the ink supplying position;

dissolving the solid ink to the liquefied ink by said heating device at the ink dissolving position;

moving said recording device in a main scan direction of the record sheet by said moving device after the solid ink is dissolved by said heating device;

recording the record information by use of the dissolved ink onto the record sheet by said recording device while said recording device is moved in the main scan direction by said moving device;

moving said recording device to a position different from the ink supplying position while said recording device is in a condition of waiting for recording the record information; and maintaining a liquefied state of the liquefied ink while said recording device is in the condition of waiting for recording the record information.

6. A printer comprising:

a heating device for heating a solid ink to dissolve the solid ink into a liquefied ink;

a recording device, on which said heating device is provided, for recording record information onto a record sheet by use of the liquefied ink;

an ink supplying device for supplying the solid ink therefrom to said recording device; and a moving device for moving said recording device to an ink supplying position when the solid ink is to be supplied to said recording device by said ink supplying device, an ink dissolving position when the solid ink is to be dissolved into the liquefied ink by said heating device, and in a main scan direction of the record sheet while the record information is recorded by use of the dissolved ink onto the record sheet by said recording device after the solid ink is dissolved by said heating device, the ink dissolving position being within a moving range of the recording device, the solid ink not being dissolved into the liquefied ink by the heating device when the recording device is within the moving range but not at the ink dissolving position.

7. A printer according to claim 6, wherein the ink dissolving position is located outside of a printing range where the record sheet is transported.

8. A printer according to claim 6, wherein said recording device records the record information by means of an ink jet method.

9. A printer comprising:

a heating device for heating a solid ink to dissolve the solid ink into a liquefied ink;

recording device, on which said heating device is provided, for recording record information onto a record sheet by use of the liquefied ink;

an ink supplying device for supplying the solid ink therefrom to said recording device; and a moving device for moving said recording device to an ink supplying position when the solid ink is to be supplied to said recording device by said ink supplying device, an ink dissolving position when the solid ink is to be dissolved into the liquefied ink by said heating device, and in a main scan direction of the record sheet while the record information is recorded by use of the dissolved ink onto the record sheet by said recording device after the solid ink is dissolved by said heating device;

a detecting device for detecting an existence or non-existence of the liquefied ink while recording the record information by said recording device, wherein said moving device moves said recording device to the ink supplying position and said ink supplying device supplies the solid ink to said recording device when the non-existence of the liquefied ink is detected by said detecting device.

10. A printer according to claim 6, wherein said moving device moves said recording device to the ink dissolving position when a main power for said printer is turned on.

11. A printer according to claim 6, further comprising another heating device provided on said recording device for heating the liquefied ink so as to maintain a liquefied state of the liquefied ink.

12. A printer according to claim 11, further comprising a guide member, at one end of which said frame member is disposed, for guiding said recording device in the main scan direction, said moving device moving and locating said recording device at another end of said guide member when said another heating device maintains the liquefied state of the liquefied ink while said recording device is in the condition of waiting for recording the record information.

13. A printer comprising:

a heating device for heating a solid ink to dissolve the solid ink into a liquefied ink;

a recording device, on which said heating device is provided, for recording record information onto a record sheet by use of the liquefied ink;

an ink supplying device for supplying the solid ink therefrom to said recording device; and a moving device for moving said recording device to an ink supplying position when the solid ink is to be supplied to said recording device by said ink supplying device, an ink dissolving position when the solid ink is to be dissolved into the liquefied ink by said heating device, and in a main scan direction of the record sheet while the record information is recorded by use of the dissolved ink onto the record sheet by said recording device after the solid ink is dissolved by said heating device;

wherein said moving device moves said recording device to a position different from the ink supplying position while said recording device is in a condition of waiting for recording the record information, and said heating device maintains a liquefied state of the liquefied ink while said recording device is in the condition of waiting for recording the record information.

14. A printer comprising:

a heating device for heating a solid ink to dissolve the solid ink into a liquefied ink;

a recording device, on which said heating device is provided, for recording record information onto a record sheet by use of the liquefied ink;

an ink supplying device for supplying the solid ink therefrom to said recording device; and a moving device for moving said recording device to an ink supplying position when the solid ink is to be supplied to said recording device by said ink supplying device, an ink dissolving position when the solid ink is to be dissolved into the liquefied ink by said heating device, and in a main scan direction of the record sheet while the record information is recorded by use of the dissolved ink onto the record sheet by said recording device after the solid ink is dissolved by said heating device;

wherein the ink supplying position is positioned at one end in the main scan direction within a movable range of said recording device, and the ink dissolving position is positioned at the other end in the main scan direction within the movable range of said recording device.

15. An information recording method by using a printer comprising: a heating device for heating a solid ink to dissolve the solid ink into a liquefied ink; a recording device, on which said heating device is provided, for recording record information onto a record sheet by use of the liquefied ink; an ink supplying device for storing the solid ink and supplying the solid ink therefrom to said recording device; and a moving device for moving said recording device, said method comprising the processes of:

moving said recording device by said moving device to an ink supplying position where the solid ink is to be supplied to said recording device;

supplying the solid ink to said recording device by said ink supplying device at the ink supplying position;

moving said recording device by said moving device to an ink dissolving position, where the solid ink is to be dissolved into the liquefied ink and which is different from the ink supplying position;

dissolving the solid ink to the liquefied ink by said heating device at the ink dissolving position;

moving said recording device in a main scan direction of the record sheet by said moving device after the solid ink is dissolved by said heating device; and recording the record information by use of the dissolved ink onto the record sheet by said recording device while said recording device is moved in the main scan direction by said moving device;

said heating device heats the solid ink while an alternative current is supplied thereto, said printer further comprises (i) a moving terminal, which is fixed on said recording device and is electrically connected to said heating device and (ii) a fixed terminal, which is fixed on a frame member of said printer and is electrically connected to an alternative current source, said moving terminal and said fixed terminal being contacted with each other at the ink dissolving position only when the solid ink is to be dissolved in said recording device, said method further comprises the process of supplying the alternative current from said alternative current source to said heating device through said fixed terminal and said moving terminal contacted with each other.

16. An information recording method by using a printer comprising: a heating device for heating a solid ink to dissolve the solid ink into a liquefied ink; a recording device, on which said heating device is provided, for recording record information onto a record sheet by use of the liquefied ink; an ink supplying device for storing the solid ink and supplying the solid ink therefrom to said recording device; and a moving device of moving said recording device, said method comprising the processes of:

moving said recording device by said moving device to an ink supplying position where the solid ink is to be supplied to said recording device;

supplying the solid ink to said recording device by said ink supplying device at the ink supplying position;

moving said recording device by said moving device to an ink dissolving position, where the solid ink is to be dissolved into the liquefied ink and which is different from the ink supplying position;

dissolving the solid ink to the liquefied ink by said heating device at the ink dissolving position;

moving said recording device in a main scan direction of the record sheet by said moving device after the solid ink is dissolved by said heating device;

recording the record information by use of the dissolved ink onto the record sheet by said recording device while said recording device is moved in the main scan direction by said moving device; and supplying a direct current from a direct current source connected to another heating device provided on said recording device so as to maintain a liquefied state of the liquefied ink while recording the record information by said recording device.

17. An information recording method by using a printer comprising: a heating device for heating a solid ink to dissolve the solid ink into a liquefied ink; a recording device, on which said heating device is provided, for recording record information onto a record sheet by use of the liquefied ink; an ink supplying device for storing the solid ink and supplying the solid ink therefrom to said recording device; and a moving device for moving said recording device, said method comprising the processes of:

moving said recording device by said moving device to an ink supplying position where the solid ink is to be supplied to said recording device;

supplying the solid ink to said recording device by said ink supplying device at the ink supplying position;

moving said recording device by said moving device to an ink dissolving position, where the solid ink is to be dissolved into the liquefied ink and which is different from the ink supplying position;

dissolving the solid ink to the liquefied ink by said heating device at the ink dissolving position;

moving said recording device in a main scan direction of the record sheet by said moving device after the solid ink is dissolved by said heating device;

recording the record information by use of the dissolved ink onto the record sheet by said recording device while said recording device is moved in the main scan direction by said moving device; and supplying a direct current from a direct current source connected to another heating device provided on said recording device so as to maintain a liquefied state of the liquefied ink while said recording device is in a condition of waiting for recording the record information.

18. A printer comprising:

a heating device for heating a solid ink to dissolve the solid ink into a liquefied ink;

a recording device, on which said heating device is provided, for recording record information onto a record sheet by use of the liquefied ink;

an ink supplying device for supplying the solid ink therefrom to said recording device; and a moving device for moving said recording device to an ink supplying position when the solid ink is to be supplied to said recording device by said ink supplying device, an ink dissolving position when the solid ink is to be dissolved into the liquefied ink by said heating device, and in a main scan direction of the record sheet while the record information is recorded by use of the dissolved ink onto the record sheet by said recording device after the solid ink is dissolved by said heating device;

wherein said heating device heats the solid ink while an alternative current is supplied thereto, and said printer further comprising:

a moving terminal fixed on said recording device and electrically connected to said heating device;

a fixed terminal fixed on a frame member of said printer and electrically connected to an alternative current source for supplying the alternative current, said moving terminal and said fixed terminal being contacted with each other at the ink dissolving position; and a controller for controlling said moving device to move said recording device to the ink dissolving position only when the solid ink is to be dissolved so that the alternative current is supplied from said alternative current source to said heating device through said fixed terminal and said moving terminal contacted with each other.

19. A printer according to claim 18, wherein said fixed terminal comprises an electrically conductive and elastic material, and said moving terminal contacts with said fixed terminal such that said moving terminal deforms said fixed terminal when the alternative current is supplied therethrough.

* * * * *